(12) United States Patent
Ducci

(10) Patent No.: US 8,245,744 B2
(45) Date of Patent: Aug. 21, 2012

(54) TIRE WITH TREAD HAVING Z-SHAPED SIPES IN CIRCUMFERENTIAL RIB

(75) Inventor: Stefano Ducci, Rome (IT)

(73) Assignee: Bridgestone Corporation, Tokyo (JP)

( * ) Notice: Subject to any disclaimer, the term of this patent is extended or adjusted under 35 U.S.C. 154(b) by 885 days.

(21) Appl. No.: 12/224,224

(22) PCT Filed: Feb. 26, 2007

(86) PCT No.: PCT/EP2007/051816
§ 371 (c)(1),
(2), (4) Date: Dec. 24, 2008

(87) PCT Pub. No.: WO2007/099085
PCT Pub. Date: Sep. 7, 2007

(65) Prior Publication Data
US 2009/0218016 A1    Sep. 3, 2009

(30) Foreign Application Priority Data

Feb. 28, 2006    (IT) .............................. TO2006A0144

(51) Int. Cl.
*B60C 11/12*    (2006.01)
(52) U.S. Cl. .......... 152/209.18; 152/209.28; 152/DIG. 3
(58) Field of Classification Search ............. 152/DIG. 3, 152/209.18, 209.28; D12/586–591
See application file for complete search history.

(56) References Cited

U.S. PATENT DOCUMENTS

| D324,011 S | * | 2/1992 | Messer | ......................... D12/588 |
| 5,896,905 A | * | 4/1999 | Lurois | ...................... 152/DIG. 3 |
| 6,003,575 A | * | 12/1999 | Koyama et al. | .......... 152/DIG. 3 |

FOREIGN PATENT DOCUMENTS

| EP | 0 469 816 A2 | 2/1992 |
| EP | 0 671 288 A1 | 9/1995 |
| EP | 0 823 340 A1 | 2/1998 |
| EP | 0 887 209 A2 | 12/1998 |
| JP | 01-254406 A | * 10/1989 |
| JP | A-1-254406 | 10/1989 |

(Continued)

OTHER PUBLICATIONS

Machine translation for Japan 07-001919 (no date).*

(Continued)

*Primary Examiner* — Steven D Maki
(74) *Attorney, Agent, or Firm* — Oliff & Berridge, PLC

(57) ABSTRACT

A tire, the tread of which has an equatorial plane and at least one raised element, which has a longitudinal axis and respective lateral edges substantially parallel to the equatorial plane, and sipes crosswise to the longitudinal axis; and wherein at least one sipe is Z-shaped and defined by three consecutive portions, a first and a third portion of which are end portions originating at respective lateral edges, and a second portion of which is an intermediate portion connected to the first portion at a first point, which is located a first distance from the lateral edge from which the relevant first portion originates, and to the third portion at a second point located a second distance from the lateral edge from which the relevant first portion originates; the intermediate portion sloping with respect to the longitudinal axis, and the second distance being less than the first distance.

8 Claims, 2 Drawing Sheets

FOREIGN PATENT DOCUMENTS

| | | | | |
|---|---|---|---|---|
| JP | 07-001919 | A | * | 1/1995 |
| JP | 07-228108 | A | * | 8/1995 |
| JP | A-11-20414 | | | 1/1999 |
| JP | 05-050812 | A | * | 3/1999 |
| JP | 2002-046426 | A | * | 2/2002 |

OTHER PUBLICATIONS

Machine translation for Japan 2002-046426 (no date).*
Machine translation for Japan 07-228105 (no date).*
Machine translation for Japan 05-050812 (no date).*

* cited by examiner

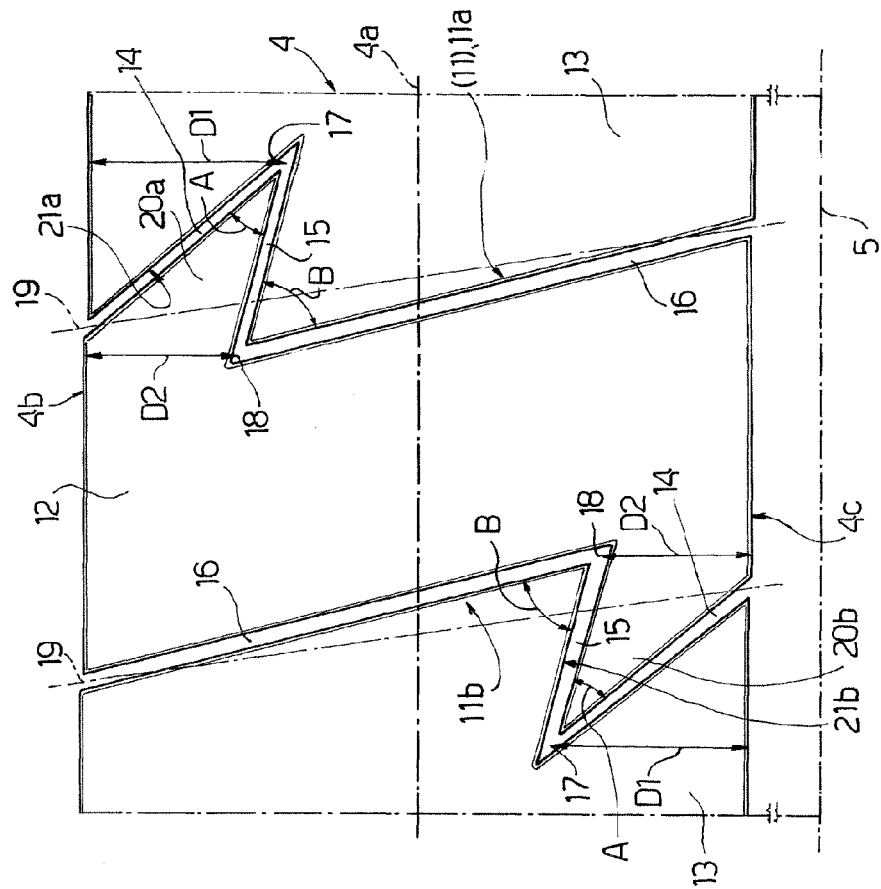
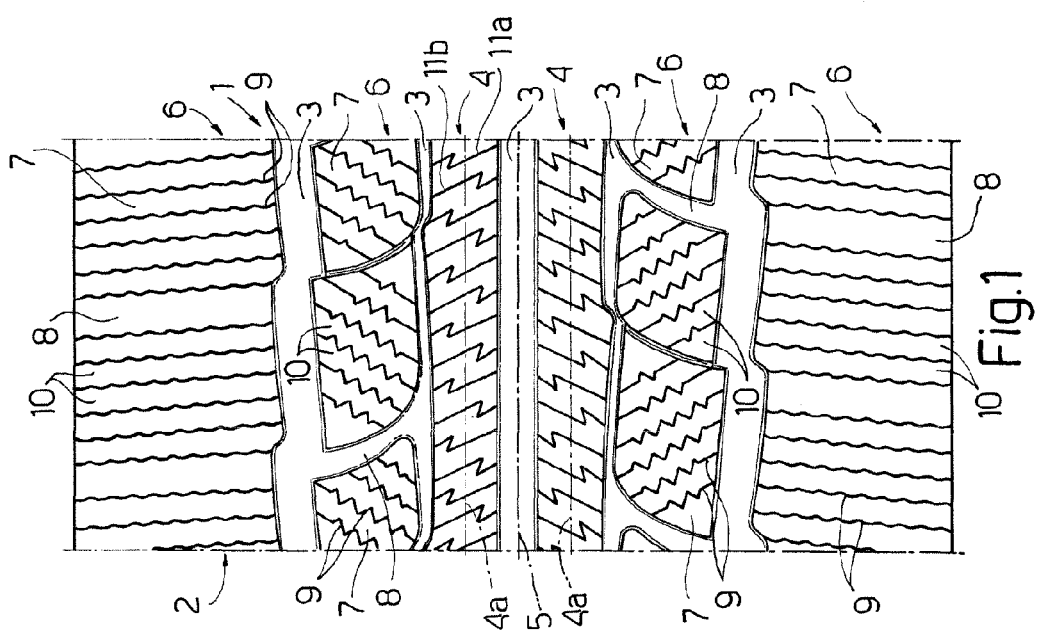

TIRE WITH TREAD HAVING Z-SHAPED SIPES IN CIRCUMFERENTIAL RIB

TECHNICAL FIELD

The present invention relates to a tyre.

BACKGROUND ART

Tyres are known in which the tread has circumferential grooves defining a number of raised elements, such as circumferential ribs and/or blocks, at least some of which have, on the outer surface, a number of sipes at various angles with respect to a motion direction of the tyre. The sipes, which divide the relative raised elements into respective numbers of relatively flexible lamellar blocks, serve not only to break up the film of water on wet road surfaces, for better tyre-ground contact in the rain, but also, and above all, to trap snow, by flexing, between adjacent lamellar blocks to improve traction, braking, and lateral stability on snow.

While improving grip of the tyre on wet road surfaces or snow, siped raised elements, on the other hand, obviously have the drawback—given the flexibility of the relative lamellar blocks, and especially on dry road surfaces—of impairing tyre performance in terms of handling capacity, traction, and braking.

DISCLOSURE OF INVENTION

It is an object of the present invention to provide a tyre designed to minimize the aforementioned drawback, while still maintaining the same wet and/or snow traction characteristics.

According to the present invention, there is provided a tyre as claimed in the attached independent claim and, preferably, in any one of the claims depending directly or indirectly on said independent claim.

BRIEF DESCRIPTION OF THE DRAWINGS

A non-limiting embodiment of the present invention will be described by way of example with reference to the accompanying drawings, in which:

FIG. 1 shows a plan view of a tread portion of a preferred embodiment of the tyre according to the present invention;

FIG. 2 shows a larger-scale, schematic view of a detail in FIG. 1;

BEST MODE FOR CARRYING OUT THE INVENTION

Figure 3:
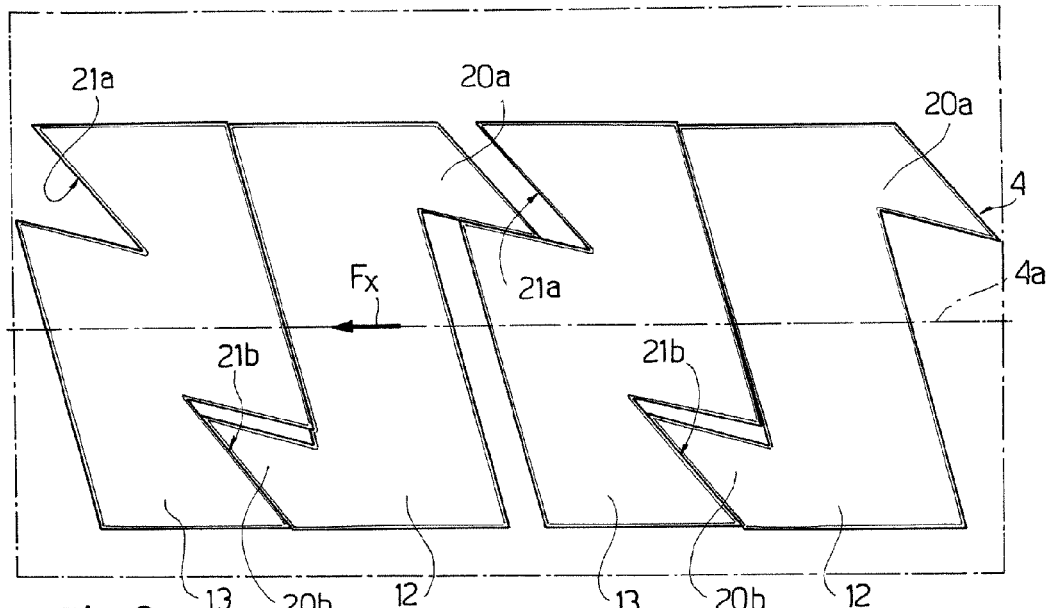
FIGS. 3 and 4 show larger-scale views of a FIG. 2 detail in two different deformed configurations.

Number 1 in FIG. 1 indicates as a whole a tyre having a tread 2, on which circumferential grooves 3 define a number of raised elements comprising a number of circumferential ribs, some of which, indicated 4, are continuous, relatively narrow, located at given distances from an equatorial plane 5, and have respective longitudinal axes 4a and respective lateral edges 4b and 4c substantially parallel to equatorial plane 5, while others, indicated 6, are divided into respective successions of blocks 7 by respective successions of transverse grooves 8.

Blocks 7 have respective, normally serrated, sipes 9 extending substantially crosswise to equatorial plane 5 and defining a relative succession of lamellar blocks 10 on each block 7; while each circumferential rib 4 has a respective succession of alternating Z-shaped sipes 11a and 11b, which extend across the whole width of relative circumferential rib 4 to define, along circumferential rib 4, a relative succession of alternating, substantially parallel, lamellar blocks 12 and 13 inclined with respect to equatorial plane 5.

As shown more clearly in FIG. 2, each sipe 11a, 11b comprises three consecutive portions 14, 15, 16. Portions 14 and 16 are end portions of relative sipe 11a, 11b and originate at the respective lateral edge 4b, 4c, and at the respective lateral edge 4c, 4b, while portion 15 is an intermediate portion connected to portion 14 at a point 17 and to portion 16 at a point 18. More specifically, in each sipe 11a, 11b, point 17 is located a distance D1 from lateral edge 4b, 4c from which the respective portion 14 originates; point 18 is located a distance D2 less than distance D1 from lateral edge 4b, 4c from which the respective portion 14 originates; and portion 15 is inclined with respect to relative longitudinal axis 4a. Portions 14 and 16 extend in opposite directions from respective points 17 and 18 with respect to portion 15, and form, with portion 15, respective angles A and B of less than 90°. In the example shown, angles A and B differ, and angle B is greater than angle A.

As shown in FIG. 2, each sipe 11a, 11b has a mean axis 19 inclined with respect to relative longitudinal axis 4a, and portions 14-16 all slope the same way with respect to mean axis 19 and relative longitudinal axis 4a.

As shown in FIG. 2, portion 16 of each sipe 11a, 11b intersects longitudinal axis 4a of relative circumferential rib 4; while portions 14 and 15 of each sipe 11a are located on the opposite side of relative longitudinal axis 4a with respect to portions 14 and 15 of each sipe 11b.

According to a variant not shown, in each sipe 11a, 11b, all portions 14, 15 and 16 intersect longitudinal axis 4a of relevant circumferential rib 4.

As a result, sipes 11a and 11b bounding each lamellar block 12 define, along the surfaces of lamellar block 12 facing respective adjacent lamellar blocks 13, a triangular appendix 20a and, respectively, a triangular appendix 20b, which, in the embodiment of FIG. 2, are located on opposite sides of longitudinal axis 4a, slope towards longitudinal axis 4a, and are housed inside respective complementary cavities 21a and 21b in adjacent lamellar blocks 13 to lock on mutually when parted in the direction of the longitudinal axis 4a.

Consequently, when subjected—for example, when braking and as shown in FIG. 3—to a longitudinal force $F_x$, i.e. a force parallel to longitudinal axis 4a, a lamellar block 12 deforms, withdraws from the adjacent lamellar block 13 upstream with respect to force $F_x$, and rests against the downstream lamellar block 13. This deformation, however, is controlled, by virtue of appendix 20a of the lamellar block 12 in question "locking" onto the upstream lamellar block 13 inside respective cavity 21a, and by the lamellar block 12 twisting slightly about its barycentre so that appendix 20b rests against one of the inner surfaces of cavity 21b of the downstream lamellar block 13.

Figure 4:
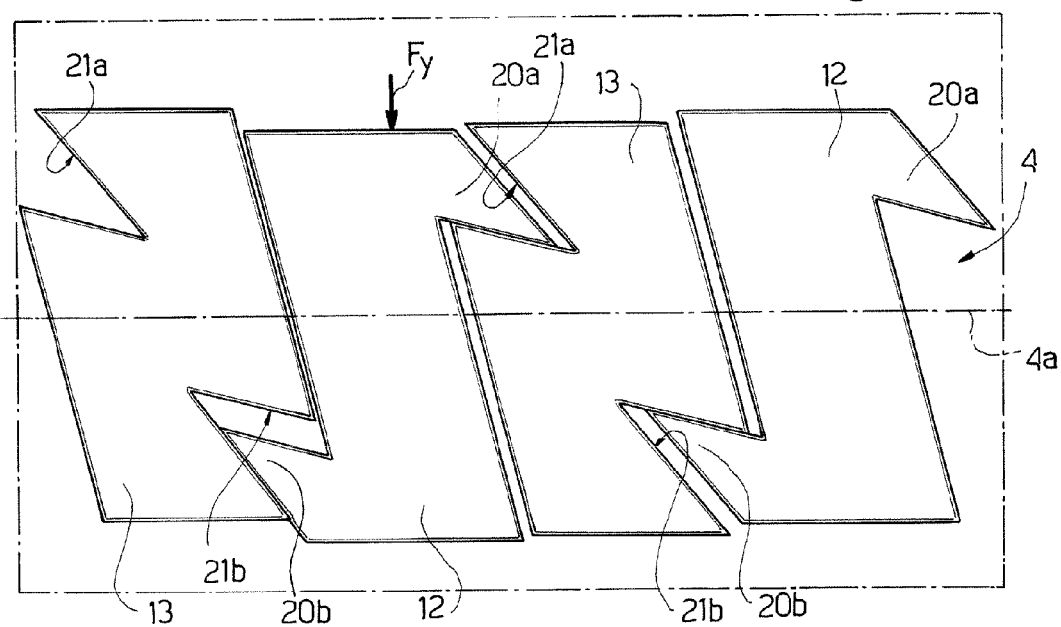

On the other hand, when subjected—for example, when cornering and as shown in FIG. 4—to a transverse force $F_y$, i.e. a force crosswise to longitudinal axis 4a, a lamellar block 12 deforms transversely. This deformation too, however, is controlled, by virtue of transverse displacement of appendixes 20a and 20b being arrested by appendixes 20a and 20b resting against the walls of relative cavities 21a and 21b of the adjacent lamellar blocks 13.

In other words, by allowing each lamellar block 12, 13 to lock onto the adjacent lamellar blocks, the form of sipes 11a and 11b allows lamellar blocks 12, 13 to deform for optimum grip on wet road surfaces or snow, while at the same time maintaining a sufficiently rigid shape of the relative rib 4 to drastically reduce any impairment in handling capacity.

The invention claimed is:
1. A tyre comprising:
a tread having an equatorial plane and at least one raised element, which has a longitudinal axis, respective lateral edges which are substantially parallel to the equatorial plane, and sipes which are crosswise to the longitudinal axis,
wherein the sipes include a plurality of Z-shaped sipes each having three consecutive portions:
a first and a third portion which are end portions originating at respective said lateral edges and a second portion which is an intermediate portion connected to the first portion at a first point and to the third portion at a second point and slopes with respect to the longitudinal axis,
wherein the first point is located a first distance from the lateral edge from which the first portion originates; and the second point is located a second distance from the lateral edge from which the first portion originates, and the second distance is less than the first distance,
wherein the raised element is a continuous circumferential rib having a succession of first Z-shaped sipes and a succession of second Z-shaped sipes, each of which is interposed between two first Z-shaped sipes,
wherein the first and second portion of each first Z-shaped sipe are located on the opposite side of the longitudinal axis of the raised element with respect to the first and second portion of each second Z-shaped sipe so that the first and second portion of each first Z-shaped sipe are closer to one of the lateral edges than the first and second portion of each second Z-shaped sipe, while the first and second portion of each second Z-shaped sipe are closer to the other of the lateral edges on the opposite side of the longitudinal axis than the first and second portion of each first Z-shaped sipe.

2. A tyre as claimed in claim 1, wherein the first and third portion extend, with respect to the second portion, in opposite directions from the first and second point respectively, and form, with the second portion, a first and second angle, respectively, of less than 90°.

3. A tyre as claimed in claim 2, wherein said first and said second angle are different.

4. A tyre as claimed in claim 2, wherein the second angle is greater than the first angle.

5. A tyre as claimed in claim 1, wherein the Z-shaped sipes have a mean axis; and wherein each of the consecutive portions are inclined with respect to the mean axis.

6. A tyre as claimed in claim 5, wherein each of the three consecutive portions slope the same way with respect to the mean axis.

7. A tyre as claimed in claim 5, wherein each of the three consecutive portions and the mean axis slope the same way with respect to the equatorial plane.

8. A tyre as claimed in claim 1, wherein, together with the two adjacent second Z-shaped sipes, each first Z-shaped sipe defines, along the rib, a first and second lamellar block adjacent to each other; and wherein the first and second Z-shaped sipe bounding each first lamellar block define, along the surfaces of the first lamellar block facing respective adjacent second lamellar blocks, a first triangular appendix and, respectively, a second triangular appendix, which are located on opposite sides of the longitudinal axis, slope towards the longitudinal axis, and are housed inside respective complementary cavities in the adjacent second lamellar blocks to lock on mutually when parted in the direction of the longitudinal axis.

* * * * *